(12) United States Patent
Grzesik et al.

(10) Patent No.: US 8,794,034 B2
(45) Date of Patent: Aug. 5, 2014

(54) APPARATUS FOR FORMING GLASS WITH EDGE DIRECTORS AND METHODS

(75) Inventors: Paul Richard Grzesik, Corning, NY (US); Ahdi El Kahlout, Lexington, KY (US); Nicolas LeBlond, Painted Post, NY (US); Gaozhu Peng, Horseheads, NY (US); Kim E Womer, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 84 days.

(21) Appl. No.: 13/482,336

(22) Filed: May 29, 2012

(65) Prior Publication Data

US 2013/0319049 A1 Dec. 5, 2013

(51) Int. Cl.
*C03B 17/06* (2006.01)

(52) U.S. Cl.
USPC ...................................... 65/53; 65/98; 65/195

(58) Field of Classification Search
CPC ............................... C03B 17/06; C03B 17/064
USPC ..................................... 65/53, 90, 91, 98, 195
See application file for complete search history.

(56) References Cited

U.S. PATENT DOCUMENTS

| | | | | |
|---|---|---|---|---|
| 2,190,296 A | * | 2/1940 | Richardson | 65/325 |
| 2,234,986 A | * | 3/1941 | Slayter et al. | 65/447 |
| 3,451,798 A | * | 6/1969 | Simon | 65/199 |
| 3,537,834 A | * | 11/1970 | Simon | 65/199 |
| 7,409,839 B2 | * | 8/2008 | Boratav et al. | 65/199 |
| 7,685,841 B2 | * | 3/2010 | Boratav et al. | 65/93 |
| 2005/0183455 A1 | | 8/2005 | Pitbladdo | 65/29.11 |
| 2010/0083704 A1 | * | 4/2010 | Grzesik et al. | 65/51 |
| 2011/0209502 A1 | | 9/2011 | El Kahlout et al. | 65/90 |

FOREIGN PATENT DOCUMENTS

| | | |
|---|---|---|
| WO | 2007/130298 | 11/2007 |
| WO | 2010/099278 | 9/2010 |

OTHER PUBLICATIONS

Y. Ning, Y. Wang and Q. Yuan, "A Bond Parameter Approach to Wettability of Molten Glass on Pt Alloy", Acta Metallurgical Sinica, vol. 17, No. 4, Aug. 1981, p. 461-466. (In Chinese).
G.J. Copley, A.D. Rivers and R. Smith, Contact Angle Measurements of E-glass with Platinum Group Metals Journal of Materials Science 10 (1975), p. 1285-1290.
Corresponding PCT Application No. PCT/US2013/043093, filed May 29, 2013, Search Report and Written Opinion.

* cited by examiner

*Primary Examiner* — Jason L Lazorcik
(74) *Attorney, Agent, or Firm* — Stephen Wentsler; Thomas R. Beall

(57) ABSTRACT

An apparatus for downwardly drawing glass ribbon comprises edge directors, wherein an outer portion defining a first pair of surfaces and a second pair of surfaces. In one example, the first and second pair of surfaces of each edge director includes a glass wettability with a static contact angle within a range of from about 30° to about 60°. In another example, the outer portion comprises a platinum alloy including from about 0.05 weight % tin to about 5 weight % tin. Methods for forming glass include the step of providing the edge director with a desired glass wettability and/or a desired platinum alloy.

18 Claims, 3 Drawing Sheets

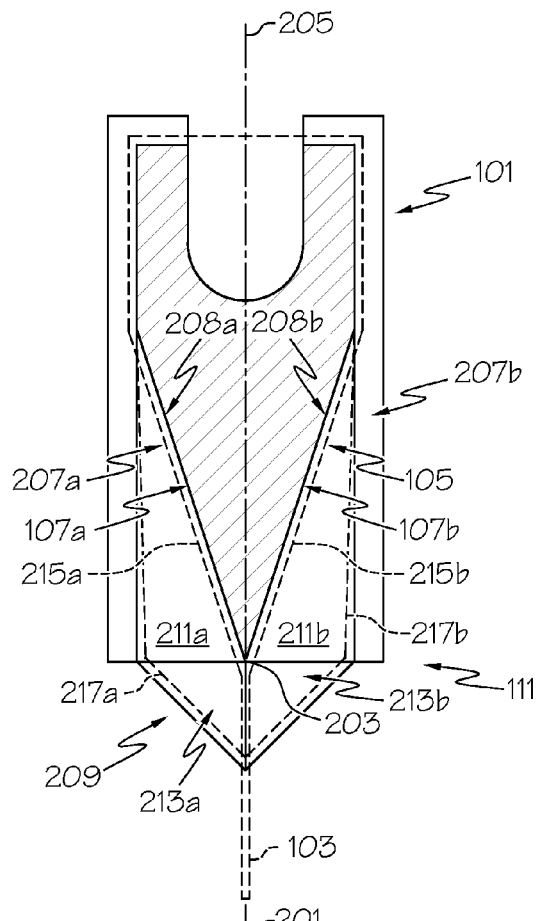
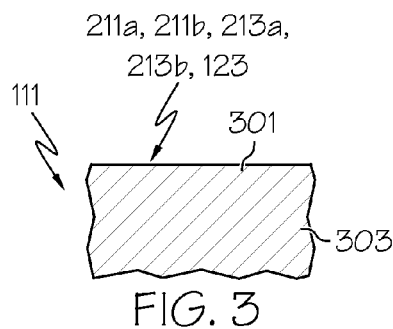
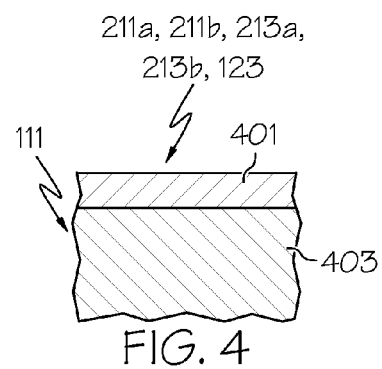
FIG. 2
FIG. 3
FIG. 4

APPARATUS FOR FORMING GLASS WITH EDGE DIRECTORS AND METHODS

FIELD OF THE INVENTION

The present invention relates generally to apparatus and methods for forming glass, and more particularly, to apparatus and methods for forming glass with edge directors.

BACKGROUND OF THE INVENTION

It is known to manufacture glass ribbon by downwardly flowing molten glass over a forming wedge. Edge directors are frequently provided at opposed ends of the forming wedge to help maintain sheet width and minimize edge bead. There is a continued need for edge directors to control the sheet edges, for example, with high end glass compositions.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present disclosure, an apparatus for downwardly drawing glass ribbon comprises a forming wedge including a pair of inclined surface portions extending between opposed ends of the forming wedge and converging along a downstream direction to form a root. A draw plane extends through the root. The apparatus also includes an edge director positioned at each of the opposed ends. Each edge director includes an outer portion defining a first pair of surfaces and a second pair of surfaces. The first pair of surfaces each extend from a corresponding one of the pair of inclined surface portions. The second pair of surfaces extend from the first pair of surfaces and converge toward the draw plane. The first and second pair of surfaces of each edge director includes a glass wettability with a static contact angle within a range of from about 30° to about 60°, such as from about 30° to about 50°.

In another example of the aspect, at least the outer portion of each edge director comprises a platinum alloy.

In yet another example of the aspect, the platinum alloy includes a metal selected from the group consisting of tin, copper and silver.

In still another example of the aspect, the platinum alloy includes tin. For instance, the platinum-tin alloy can include less than about 5 weight % tin, such as from about 0.05 weight % tin to about 3.5 weight % tin, such as from about 0.5 weight % tin to about 2.5 weight % tin.

In accordance with another aspect of the disclosure, an apparatus for downwardly drawing glass ribbon comprises a forming wedge including a pair of inclined surface portions extending between opposed ends of the forming wedge and converging along a downstream direction to form a root. A draw plane extends through the root. The apparatus further includes an edge director positioned at each of the opposed ends. Each edge director includes an outer portion defining a first pair of surfaces and a second pair of surfaces. The first pair of surfaces each extend from a corresponding one of the pair of inclined surface portions and the second pair of surfaces extend from the first pair of surfaces and converge toward the draw plane, wherein the outer portion comprises a platinum alloy including from about 0.05 weight % tin to about 5 weight % tin.

In accordance with one example of the aspect, the platinum alloy includes from about 0.05 weight % tin to about 3.5 weight % tin, such as from about 0.5 weight % tin to about 2.5 weight % tin.

In another example of the aspect, the first and second pair of surfaces of each edge director includes a glass wettability with a static contact angle within a range of from about 30° to about 60°, such as from about 30° to about 50°.

In accordance with yet another aspect of the disclosure, a method for forming glass comprises the step of providing a forming wedge including a pair of inclined surface portions extending between opposed ends of the forming wedge and converging along a downstream direction to form a root, wherein a draw plane extends through the root. The method also includes the step of providing an edge director positioned at each of the opposed ends. Each edge director includes an outer portion defining a first pair of surfaces and a second pair of surfaces. The first pair of surfaces each extend from a corresponding one of the pair of inclined surface portions and the second pair of surfaces extend from the first pair of surfaces and converge toward the draw plane. The first and second pair of surfaces of each edge director includes a glass wettability with a static contact angle within a range of from about 30° to about 60°, such as from about 30° to about 50°. The method also includes the step of flowing a molten glass sheet over each of the pair of inclined surface portions of the forming wedge. The method further includes the step of flowing a first pair of lateral edges of the molten glass sheets over corresponding first surfaces of the first edge director and flowing a second pair of lateral edges of the molten glass sheets over corresponding first surfaces of the second edge director, wherein the thickness of each of the first and second pair of lateral edges is decreased. The method also includes the step of flowing the first pair of lateral edges over corresponding second surfaces of the first edge director and flowing the second pair of lateral edges of the molten glass sheets over corresponding second surfaces of the second edge director, wherein the first and second pair of lateral edges each converge together toward the draw plane. The method also includes the step of drawing the first pair of lateral edges off the first edge director and drawing the second pair of lateral edges off the second edge director, wherein the first pair of lateral edges fuse together to form a first fused edge of a glass ribbon and the second pair of lateral edges fuse together to form a second fused edge of the glass ribbon.

In accordance with another example of the aspect, the outer portion comprises a platinum alloy including from about 0.05 weight % tin to about 5 weight % tin, such as from about 0.05 weight % tin to about 3.5 weight % tin.

In accordance with yet another aspect of the disclosure, a method for forming glass comprises the step of providing a forming wedge including a pair of inclined surface portions extending between opposed ends of the forming wedge and converging along a downstream direction to form a root, wherein a draw plane extends through the root. The method also includes the step of providing an edge director positioned at each of the opposed ends. Each edge director includes an outer portion defining a first pair of surfaces and a second pair of surfaces. The first pair of surfaces each extend from a corresponding one of the pair of inclined surface portions and the second pair of surfaces extend from the first pair of surfaces and converge toward the draw plane. The outer portion comprises a platinum alloy including from about 0.05 weight % tin to about 5 weight % tin, such as from about 0.05 weight % tin to about 3.5 weight % tin, such as from about 0.5 weight % tin to about 2.5 weight % tin. The method also includes the step of flowing a molten glass sheet over each of the pair of inclined surface portions of the forming wedge. The method still further includes the step of flowing a first pair of lateral edges of the molten glass sheets over corresponding first surfaces of the first edge director and flowing a second pair of lateral edges of the molten glass sheets over corresponding first surfaces of the second edge director, wherein the thickness of each of the first and second pair of lateral edges is decreased. The method also includes the step of flowing the first pair of lateral edges over corresponding second surfaces of the first edge director and flowing the second pair of lateral edges of the molten glass sheets over corresponding second surfaces of the second edge director, wherein the first and second pair of lateral edges each converge together toward the draw plane. The method also includes the step of drawing the first pair of lateral edges off the first edge director and drawing the second pair of lateral edges off the second edge director, wherein the first pair of lateral edges fuse together to form a first fused edge of a glass ribbon and the second pair of lateral edges fuse together to form a second fused edge of the glass ribbon.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 2 is a sectional view of the apparatus along line 2-2 of FIG. 1;

FIG. 3 is a partial sectional view of a portion of the edge director in accordance with one example of the disclosure;

FIG. 4 is a partial sectional view of a portion of the edge director in accordance with another example of the disclosure;

DETAILED DESCRIPTION

Figure 1:
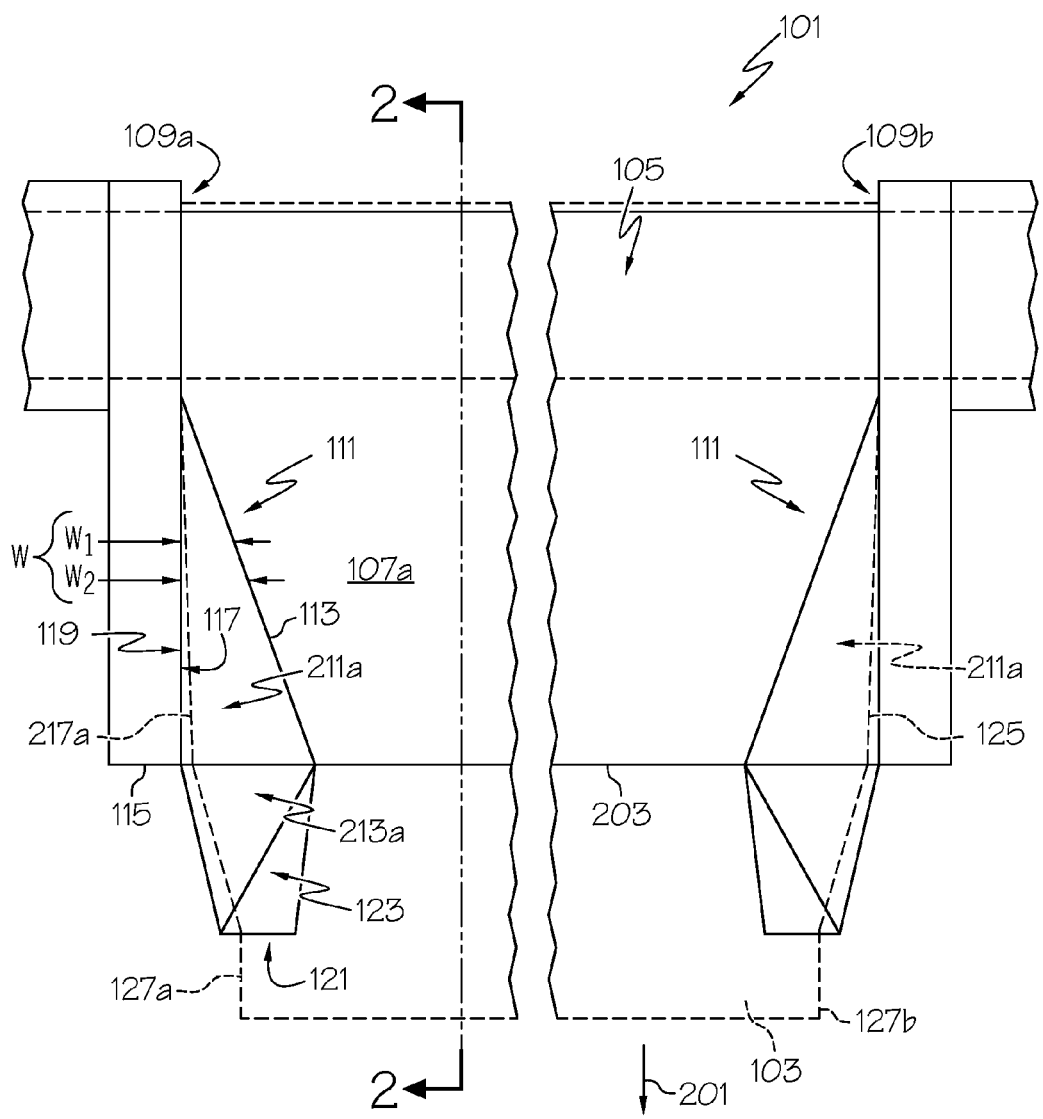
FIG. 1 a partial schematic side view of an apparatus for forming glass with edge directors incorporating example aspects of the present disclosure.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Aspects of the present invention can be used with various apparatus for drawing glass ribbon. FIGS. 1 and 2 illustrate aspects of one example apparatus 101 for downwardly drawing a glass ribbon 103. The example apparatus 101 comprises a forming wedge 105 including a pair of inclined surface portions 107a, 107b extending between opposed ends 109a, 109b of the forming wedge 105. As shown in FIG. 2, the pair of inclined surface portions 107a, 107b converges along a downstream direction 201 to form a root 203. A draw plane 205 extends through the root 203 wherein the glass ribbon 103 may be drawn in the downstream direction 201 along the draw plane 205. As shown, the draw plane 205 can bisect the root 203 although the draw plane 205 may extend at other orientations with respect to the root 203.

As shown in FIG. 1, an edge director can be positioned at each of the opposed ends of the forming wedge. Indeed, a first edge director 111 can be positioned at a first end 109a and a second identical edge director 111 can be positioned at a second end 109b. Providing identical edge directors can be beneficial to provide a uniform glass sheet although the edge directors may have different configurations in further examples.

As shown in FIG. 2, the edge director 111 can include a pair of upper portions 207a, 207b that may be joined together by a lower portion 209. Joining the upper portions together can be beneficial to simplify assembly of the edge director 111 to the forming wedge 105. In further examples, the upper portions 207a, 207b may be provided separately. For example, the edge director 111 can be separate from one another and assembled independently to each of the pair of inclined surface portions 107a, 107b of the forming wedge 105. With certain configurations, providing upper portions that are not joined may simplify manufacturing of the edge directors.

The edge directors 111 can be mounted to the forming wedge 105 by engaging an inner surface portion 208a of the first upper portion 207a with the first inclined surface portion 107a of the forming wedge 105. Likewise, an inner surface portion 208b of the second upper portion 207b can be engaged with the second inclined surface portion 107b of the forming wedge 105. As shown in FIG. 1, each opposed end 109a, 109b can include a retaining block 115 designed to help laterally position the corresponding edge director 111 in place. For example, optional retaining blocks 115 can include a pair of planar surfaces 117 (only one shown in FIG. 1) that straddle the forming wedge 105.

The planar surfaces 117 are designed to abut corresponding planar surfaces 119 (only one shown in FIG. 1) of the pair of upper portions 207a, 207b of the edge director 111. Once positioned, the edge directors 111 can be fastened in the position shown.

The pair of upper portions 207a, 207b of the edge director 111 can include a corresponding pair of first surfaces 211a, 211b. As shown in FIG. 2, the first pair of surfaces 211a, 211b can each extend from a corresponding one of the pair of inclined surface portions 107a, 107b. For example, the first surface 211a can extend from a first inclined surface portion 107a and the second surface 211b can extend from the second inclined surface portion 107b of the forming wedge 105. As shown, the first pair of surfaces 211a, 211b can be substantially planar although the surfaces can be substantially concave and/or include other surface characteristics in further examples. Moreover, as shown, the first pair of surfaces 211a, 211b are identical to one another although the surfaces may have different configurations in further examples.

As shown in FIG. 1, each of the first pair of surfaces 211a, 211b can include a transverse width "W" that increases in the downstream direction 201. For example, as shown, the first surfaces can have a first transverse width "W1" and a second downstream transverse width "W2" that is greater than the first transverse width "W1." As shown, the transverse width "W" can increase in a substantially constant manner to define a linear edge 113 configured to follow the profile of the corresponding inclined surface portion of the forming wedge 105. Although not shown, the transverse width of further embodiments herein may increase in nonlinear fashion.

Referring again to FIG. 2, the edge director 111 can further include a second pair of surfaces 213a, 213b extending from the first pair of surfaces 211a, 211b and converging toward the draw plane 205 downstream from the root 203. As shown, the second pair of surfaces 213a, 213b can be substantially planar although the surfaces can be substantially concave and/or include other surfaces characteristics in further examples. Moreover, as shown, the second pair of surfaces 213a, 213b can be substantially identical to one another although the surfaces may have different configurations in further examples.

The edge director 111 can still further include an optional downstream structure extending with respect to the second pair of surfaces 213a, 213b and downstream from the root 203. As shown in FIG. 1, the downstream structure of the edge director 111 can comprise an optional blade 121 extending with respect to the second pair of surfaces 213a, 213b. The blade 121 can comprise a first surface 123 extending from the first surface 213a of the second pair of surface and a second surface (not shown) extending from the second surface 213b of the second pair of surfaces.

FIG. 3 is representative of a partial cross section of an outer portion 301 of the edge director 111 that defines the first pair of surfaces 211a, 211b and the second pair of surfaces 213a, 213b. Optionally, the outer portion 301 of the edge director 111 can also define the first surface 123 and/or the second surface of the blade 121 if provided. As shown in FIG. 3, the outer portion 301 can be of the same composition as an inner portion 303 of the edge director 111. For example, the entire edge director 111 can be formed from a single composition material and/or may be provided as a single integral piece.

FIG. 4 is a representative partial cross section of another outer portion 401 of the edge director 111 that defines the first pair of surfaces 211a, 211b and the second pair of surfaces 213a, 213b. Optionally, the outer portion 401 of the edge director 111 can also define the first surface 123 and/or the second surface of the blade 121 if provided. As shown in FIG. 4, the outer portion 401 can be of a different composition than the inner portion 403. For example, the outer portion 401 may comprise a layer of material that is disposed over an inner portion 403 of the edge director 111. The outer portion 401 may be provided by vapor deposition to the inner portion 403 or other techniques.

In one example, an existing edge director may be retrofitted to include the outer portion 401. For example, a platinum alloy may be provided as an outer portion 401 on an inner portion 403 comprising an existing platinum edge director. In such an example, a coating of tin, silver and/or copper can be applied onto a standard pure platinum edge director after it is fabricated. Because wetting is a surface phenomenon, only the composition at the surface of the edge director affects the wetting of the glass surface with the molten glass. The coating could be applied using one of various methods, although electroplating may be particularly well suited to provide the metal coating. The coating could consist of pure tin, silver, copper and/or a mixture of these metals, or a mixture of one or more of these metals with platinum. For example, a platinum-tin coating may be applied to a pure platinum edge director in examples of the disclosure.

The first pair of surfaces 211a, 211b and the second pair of surfaces 213a, 213b defined by the outer portion 301, 401 can include a glass wettability that is relatively high when compared to the surfaces of a conventional edge director. As used throughout the application, glass wettability can be defined as how easily a cylinder Eagle XG® glass spreads over a horizontal surface in accordance with the following testing procedure. The glass wettability, as used herein, can be measured by conducting an experiment where a 9 mm diameter×12 mm height glass cylinder of Eagle XG® glass is placed on a surface of a sample to be tested. Eagle XG® glass is available from Corning, Inc., and has a glass composition of Eagle XG® glass as available from Corning, Inc. on the filing date of this application. During the test, the sample with the glass cylinder is placed in a furnace that is fitted with a fused silica muffle. The furnace is heated at a rate of 10° C./min to 1200° C. measured at the same test location in air. The temperature is then held at 1200° C. for 20 hours. After holding the temperature for 20 hours, images of the glass drops are acquired and the static contact angle can then be measured at the interface of the glass drops and the surface of the sample. Exact values of the contact angles may change for different glass compositions. In some examples, features of the disclosure can be used with Alkaline Earth Boro-Aluminosilicate glasses (e.g., Eagle XG® glass) or other glass compositions.

Figure 5:
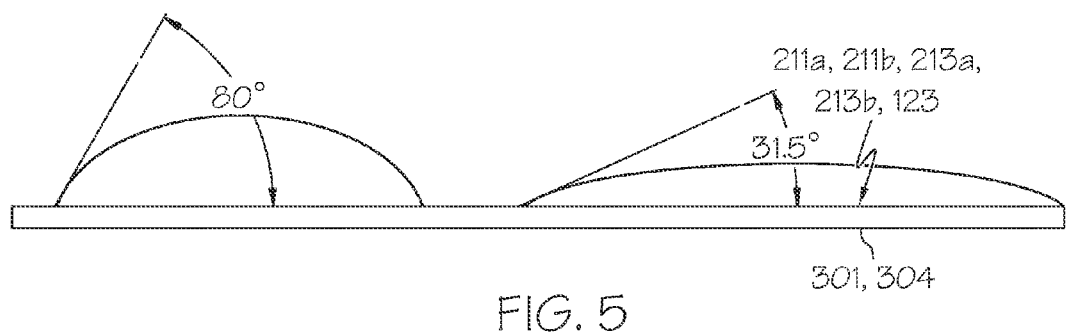
FIG. 5 illustrates different static contact angles resulting from different sample compositions.

The left side of FIG. 5 illustrates the glass wettability of a conventional surface of a conventional pure as-rolled platinum sample. As shown, the glass wettability is relatively low since the contact angle (i.e., about) 80° is relatively high. In contrast, the right side of FIG. 5 illustrates the glass wettability of a surface in accordance with aspects of the present disclosure including a platinum alloy that is likewise rolled with a similar surface roughness when compared to the surface roughness of the conventional sample on the left. As shown, the platinum alloy sample of FIG. 5 comprises a platinum alloy including 1.65 weight % tin (Sn) and the remaining weight of the sample comprising platinum (Pt). As shown, the surface of the present invention can include a relatively high wettability since the static contact angle is relatively low (i.e., about 31.5° on the right side of FIG. 5).

Glass wettability can be influenced by the surface roughness of the sample. It was observed, however, that the static contact angle of a surface from an as-rolled pure platinum surface was approximately the same as a 320 grit-roughened pure platinum surface having a surface roughness of about 8-10 microinches. However, the static contact angle of a sand-blasted pure platinum sample was significantly higher, indicating a reduced glass wettability. As such, aspects of the disclosure may optionally be used with surface roughnesses of less than 8-10 microinches.

As set forth above, a surface with relatively high glass wettability can be defined as those surfaces with relatively low contact angles after conducting the testing procedure above. Likewise, a surface with relatively low glass wettability can be defined as those surfaces with relatively high contact angles after conducting the testing procedure above. In some examples of the present invention, the first and second pair of surfaces 211a, 211b, 213a, 213b can include a relatively high glass wettability with a static contact angle of less than about 60°, such as from about 30° to about 60°, such as from about 30° to about 50°, such as from about 30° to about 40°, such as from about 30° to about 35°.

Providing a relatively high glass wettability can be desired to enhance glass formation in accordance with aspects of the disclosure. Indeed, a relatively high glass wettability is believed to facilitate reduction of devitrification growth on the edge director, thereby, increasing the life of the edge director and improve short and long term thickness and fused edge bead quality of the glass ribbon.

Increasing the glass wettability can be achieved, for example, by providing an edge director from a platinum alloy rather than fabricating the edge director from pure platinum. Providing a platinum alloy can increase the strength of the edge director while also increasing the glass wettability. In one example, desirable glass wettability may be achieved wherein the platinum alloy comprises a metal selected from the group consisting of tin, copper and silver. For instance, the platinum alloy can include tin. Tin may be particularly beneficial in applications where the apparatus will be downwardly drawing glass including tin within the composition of the glass. As such, tin will remain in the glass and there will be a reduced tendency of tin otherwise being drawn out of the glass into the pure platinum. In a case where pure platinum is used for the edge director, the outer surface of the pure platinum edge director in contact with the molten glass including tin in the molten glass composition may form a platinum-tin alloy at the contact surface of the edge director but in reduced quantities less than 0.01 weight percent tin and in a quantity that does not result in increased glass wettability to the point where the contact angle would be reduced to a static contact angle of 60° or less.

It is also noted that providing a platinum tin alloy was observed to result in a liquidus temperature for Eagle XG® glass at the Pt—Sn interface (~98% Pt/2% Sn) that is comparable or lower than that of a Pt interface (100% Pt).

Figure 6:
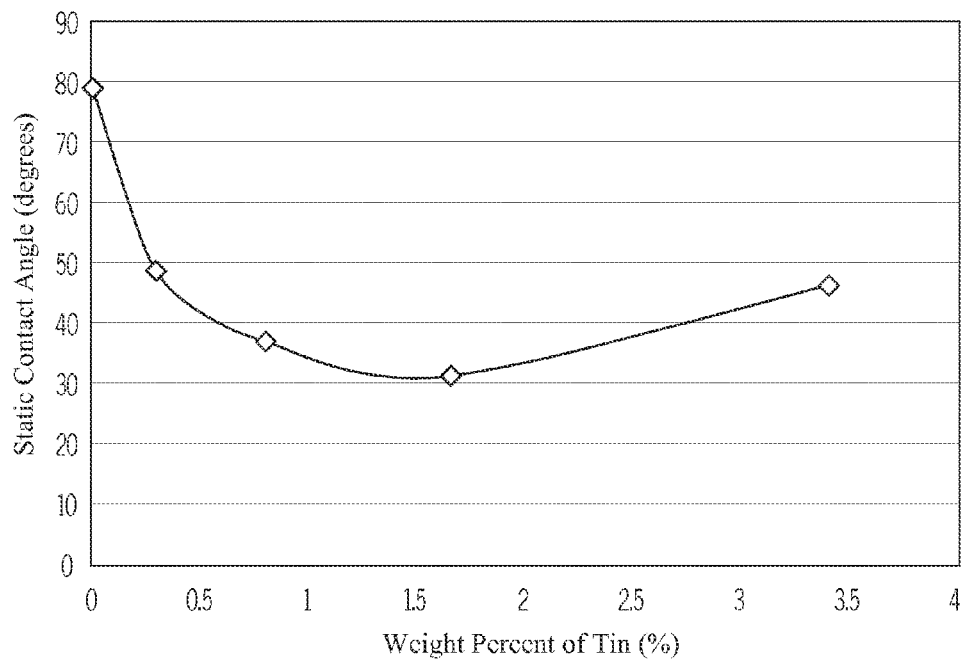
FIG. 6 is a chart demonstrating different static contact angles resulting from different sample compositions.

FIG. 6 is a chart demonstrating observed glass wettability with a platinum alloy including different weight percentages of tin (Sn) with the remaining weight comprising platinum (Pt). The vertical axis is the static contact angle in degrees and the horizontal axis is the weight percent of tin (Sn). As shown, with a pure as-rolled platinum (~100% Pt/0% Sn), the static contact angle is approximately 80°. As shown, small amounts of tin (Sn) in the platinum alloy can significantly lower the static contact angle and thereby increase the glass wettability of the surface. For instance, as shown, a platinum-tin alloy of about 0.3 weight percent tin (~99.7% Pt/0.3% Sn) was observed to reduce the contact angle to 49°. As further illustrated, a platinum-tin alloy of about 0.8 weight percent tin (~99.2% Pt/0.8% Sn) was observed to further reduce the contact angle to 37°. As still further illustrated, a platinum-tin alloy of about 1.65 weight percent tin (~98.35% Pt/1.65% Sn) was observed to further reduce the contact angle to 31.5°. However, it was also observed that a platinum alloy with higher percentages of tin (Sn) provided no further benefit in reduced contact angle, although the contact angle was still reduced when compared to a pure as-rolled platinum sample. For instance, a platinum alloy of about 3.4 weight percent tin (~96.6% Pt/3.4% Sn) was observed to increase the static contact angle to about 46.3°. Therefore, the increased amount of tin beyond a certain point was observed to decrease the glass wettability. The decrease in wettability may be due to inhomogeneity within the platinum-tin alloy. Based on the curve fitted to the data shown in FIG. 6, maximum glass wettability may occur with a platinum-tin alloy of about 1.5 weight percent tin (Sn) (~98.5% Pt/1.5% Sn).

In some examples, at least the outer portion 301, 401 of each edge director 111 comprises a platinum-tin alloy including tin in an amount that is less than about 5 weight % tin. For example, the platinum-tin alloy can include from about 0.05 weight % tin to about 3.5 weight % tin, such as about 0.07 weight % tin to about 3.5 weight % tin, such as about 0.1 weight % tin to about 3.5 weight % tin, such as about 0.3 weight % tin to about 3.5 weight % tin. In another example, the platinum-tin alloy can include from about 0.5 weight % tin to about 2.5 weight % tin, such as from about 1 weight % tin to about 2 weight % tin, such as about 1.25 weight % tin to about 1.75 weight % tin, such as about 1.5 weight % tin.

In further examples, at least the outer portion 301, 401 of each edge director 111 may comprise a platinum alloy (e.g., including tin, copper and/or silver) in an amount such that the static contact angle is less than about 60°, such as from about 30° to about 60°, such as from about 30° to about 50°, such as from about 30° to about 40°, such as from about 30° to about 35°.

A method for forming glass will now be described with respect to an apparatus 101 including the example edge directors 111. It will be appreciated that similar or identical method steps may be performed with further examples, for instance, as described throughout the application. Moreover, example methods of the present invention may omit and/or add additional steps. Unless noted, the steps can be performed simultaneously, sequentially or in different orders depending on the particular application.

As shown in FIGS. 1 and 2, methods of forming glass with the example apparatus 101 including the edge directors 111 as schematically illustrated. FIG. 2 illustrates example methods being performed with the first edge director 111 located at the first end 109a of the forming wedge 105. FIG. 2 is also representative of a cross section taken at the opposite direction illustrated in FIG. 1. Thus, FIG. 2 also represents example methods being performed with the second edge director 111 located at the second end 109b.

The method can include the step of providing the forming wedge 105 including the pair of inclined surface portions 107a, 107b extending between the opposed ends 109a, 109b of the forming wedge 105 and converging along the downstream direction 201 to form the root 203. As shown in FIG. 2, the draw plane 205 extends through the root 203.

The method further includes the step of providing the edge director 111 positioned at each of the opposed ends 109a, 109b. As discussed previously with respect to FIGS. 3 and 4, each edge director 111 includes the outer portion 301, 401 defining the first pair of surfaces 211a, 211b and the second pair of surfaces 213a, 213b. The first pair of surfaces 211a, 211b each extends from the corresponding one of the pair of inclined surface portions 107a, 107b of the forming wedge 105. Moreover, the second pair of surfaces 123a, 213b extends from the first pair of surfaces 211a, 211b and converge toward the draw plane 205.

In one example, the first and second pair of surfaces 211a, 211b, 213a, 213b of each edge director 111 includes a glass wettability with a static contact angle of less than about 60°, such as within a range of from about 30° to about 60°, such as from about 30° to about 50°, such as from about 30° to about 40°, such as from about 30° to about 35°.

In some examples, at least the outer portion 301, 401 of each edge director 111, such as the entire edge director, can comprise a platinum alloy. In one example, the platinum alloy includes a metal selected from the group consisting of tin, copper and silver to respectively form a platinum-tin alloy, a platinum-copper alloy or a platinum-silver alloy. For instance, the platinum alloy can comprise a platinum-tin alloy including tin in an amount that is less than about 5 weight % tin (Sn). For example, the platinum-tin alloy can include from about 0.05 weight % tin (Sn) to about 3.5 weight % tin (Sn). In another example, the platinum-tin alloy can include from about 0.5 weight % tin (Sn) to about 2.5 weight % tin (Sn), such as from about 1 weight % tin (Sn) to about 2 weight % tin (Sn), such as about 1.25 weight % tin (Sn) to about 1.75 weight % tin (Sn), such as about 1.5 weight % tin (Sn).

The method can further include the step of flowing a molten glass sheet over each of the pair of inclined surface portions 107a, 107b of the forming wedge 105. For example, as shown in FIG. 2, a central portion 215a of a first molten glass sheet flows over the first inclined surface portion 107a of the forming wedge 105. Likewise, a central portion 215b of a second molten glass sheet flows over the second inclined surface portion 107b of the forming wedge 105.

As shown in FIG. 2, the method can also include the step of flowing a first pair of lateral edges 217a, 217b of the molten glass sheets over corresponding first surfaces 211a, 211b of the first edge director 111 and flowing a second pair of lateral edges of the molten glass sheets over corresponding first surfaces 211a, 211b of the second edge director, wherein the thickness of each of the first and second pair of lateral edges is decreased. One of a second pair of lateral edges of the molten glass sheets is referenced as 125 in FIG. 1 wherein the other of the pair of lateral edges is hidden. As the first and second edge director can be identical, it will be appreciated that FIG. 2 also provides a representation of flowing of the second pair of lateral edges (see 125) of the molten glass sheets over corresponding first surfaces 211a, 211b of the second edge director 111 to decrease the thickness of each of the second pair of lateral edges. As each of the first pair of surfaces 211a, 211b extend from a corresponding one of the pair of inclined surface portions 107a, 107b, the surface area of travel increases in the downward direction, thereby stretching out the edge portions of the corresponding glass sheet to decrease the thickness of each of the pair of lateral edges.

The method further includes the step of flowing the first pair of lateral edges 217a, 217b over corresponding second surfaces 213a, 213b of the first edge director 111 and flowing the second pair of lateral edges of the molten glass sheets over corresponding second surfaces of the second edge director, wherein the first and second pair of lateral edges each converge together toward the draw plane 205.

The method further includes the step of drawing the first pair of lateral edges 217a, 217b off the first edge director 111 and drawing the second pair of lateral edges off the second edge director. The first pair of lateral edges 217a, 217b fuse together to form a first fused edge 127a of the glass ribbon 103 and the second pair of lateral edges fuse together to form a second fused edge 127b of the glass ribbon 103.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method for forming glass comprising the steps of:
   providing a forming wedge including a pair of inclined surface portions extending between opposed ends of the forming wedge and converging along a downstream direction to form a root, wherein a draw plane extends through the root;
   providing an edge director positioned at each of the opposed ends, each edge director including an outer portion defining a first pair of surfaces and a second pair of surfaces, wherein the first pair of surfaces each extend from a corresponding one of the pair of inclined surface portions, the second pair of surfaces extend from the first pair of surfaces and converge toward the draw plane, wherein, the outer portion comprises a platinum alloy including a metal selected from the group consisting of tin, copper and silver, and wherein the first and second pair of surfaces of each edge director includes a glass wettability with a static contact angle within a range of from about 30° to about 60°;
   flowing a molten glass sheet over each of the pair of inclined surface portions of the forming wedge;
   flowing a first pair of lateral edges of the molten glass sheets over corresponding first surfaces of the first edge director and flowing a second pair of lateral edges of the molten glass sheets over corresponding first surfaces of the second edge director, wherein the thickness of each of the first and second pair of lateral edges is decreased;
   flowing the first pair of lateral edges over corresponding second surfaces of the first edge director and flowing the second pair of lateral edges of the molten glass sheets over corresponding second surfaces of the second edge director, wherein the first and second pair of lateral edges each converge together toward the draw plane; and
   drawing the first pair of lateral edges off the first edge director and drawing the second pair of lateral edges off the second edge director, wherein the first pair of lateral edges fuse together to form a first fused edge of a glass ribbon and the second pair of lateral edges fuse together to form a second fused edge of the glass ribbon.

2. The method of claim 1, wherein the first and second pair of surfaces are each provided with the range of the static contact angle being from about 30° to about 50°.

3. The method of claim 2, wherein the first and second pair of surfaces are each provided with the range of the static contact angle being from about 30° to about 40°.

4. The method of claim 3, wherein the first and second pair of surfaces are each provided with the range of the static contact angle being from about 30° to about 35°.

5. The method of claim 1, wherein the outer portion comprises a platinum alloy including from about 0.05 weight % tin to about 5 weight % tin.

6. The method of claim 5, wherein the platinum alloy includes from about 0.05 weight % tin to about 3.5 weight % tin.

7. The method of claim 1, wherein the first and second pair of surfaces are each provided with the range of the static contact angle being from about 30° to about 50°.

8. The method of claim 7, wherein the first and second pair of surfaces are each provided with the range of the static contact angle being from about 30° to about 40°.

9. The method of claim 8, wherein the first and second pair of surfaces are each provided with the range of the static contact angle being from about 30° to about 35°.

10. A method for forming glass comprising the steps of:
    providing a forming wedge including a pair of inclined surface portions extending between opposed ends of the forming wedge and converging along a downstream direction to form a root, wherein a draw plane extends through the root;
    providing an edge director positioned at each of the opposed ends, each edge director including an outer portion defining a first pair of surfaces and a second pair of surfaces, wherein the first pair of surfaces each extend from a corresponding one of the pair of inclined surface portions, the second pair of surfaces extend from the first pair of surfaces and converge toward the draw plane, wherein the outer portion comprises a platinum alloy including from about 0.05 weight % tin to about 5 weight % tin;
    flowing a molten glass sheet over each of the pair of inclined surface portions of the forming wedge;
    flowing a first pair of lateral edges of the molten glass sheets over corresponding first surfaces of the first edge director and flowing a second pair of lateral edges of the molten glass sheets over corresponding first surfaces of the second edge director, wherein the thickness of each of the first and second pair of lateral edges is decreased;
    flowing the first pair of lateral edges over corresponding second surfaces of the first edge director and flowing the second pair of lateral edges of the molten glass sheets over corresponding second surfaces of the second edge director, wherein the first and second pair of lateral edges each converge together toward the draw plane; and drawing the first pair of lateral edges off the first edge director and drawing the second pair of lateral edges off the second edge director, wherein the first pair of lateral edges fuse together to form a first fused edge of a glass ribbon and the second pair of lateral edges fuse together to form a second fused edge of the glass ribbon.

11. The method of claim 10, wherein the platinum alloy includes from about 0.05 weight % tin to about 3.5 weight % tin.

12. The method of claim 11, wherein the platinum alloy includes from about 0.07 weight % tin to about 3.5 weight % tin.

13. The method of claim 12, wherein the platinum alloy includes from about 0.1 weight % tin to about 3.5 weight % tin.

14. The method of claim 13, wherein the platinum alloy includes from about 0.3 weight % tin to about 3.5 weight % tin.

15. The method of claim 14, wherein the platinum alloy includes from about 0.5 weight % tin to about 2.5 weight % tin.

16. The method of claim 15, wherein the platinum alloy includes from about 1 weight % tin to about 2 weight % tin.

17. The method of claim 16, wherein the platinum alloy includes from about 1.25 weight % tin to about 1.75 weight % tin.

18. The method of claim 17, wherein the platinum alloy includes about 1.5 weight % tin.

* * * * *